Dec. 10, 1940.   A. G. SHEARER   2,224,198
ELECTRIC IRON AND SUPPORT FOR SAID IRON
Filed Aug. 4, 1939    3 Sheets-Sheet 2
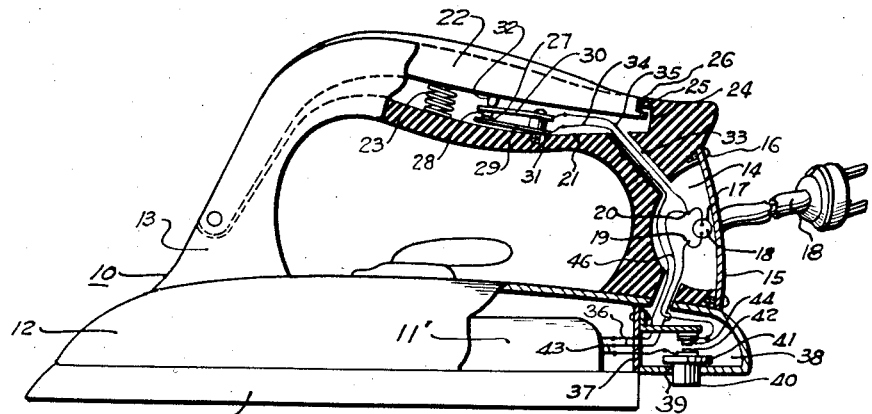
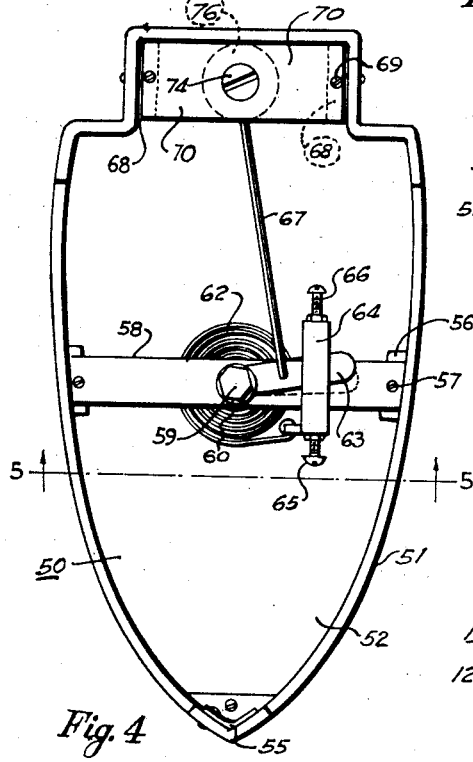
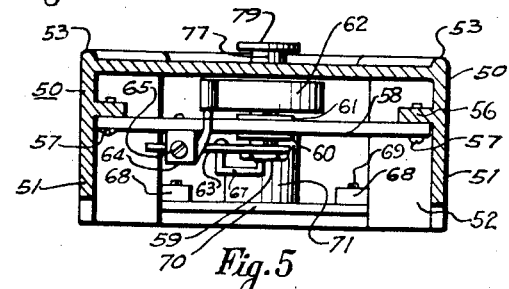
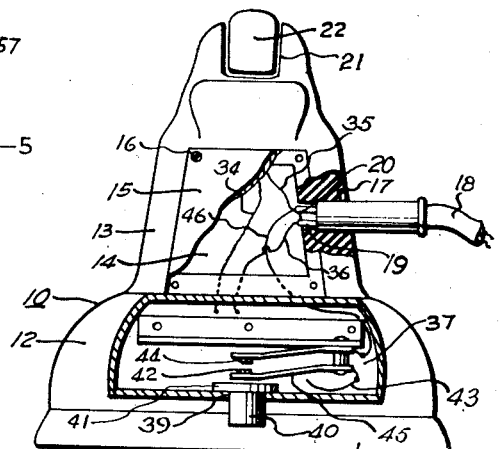
Inventor
Arthur G. Shearer
By Jack A. Atchley
Attorney

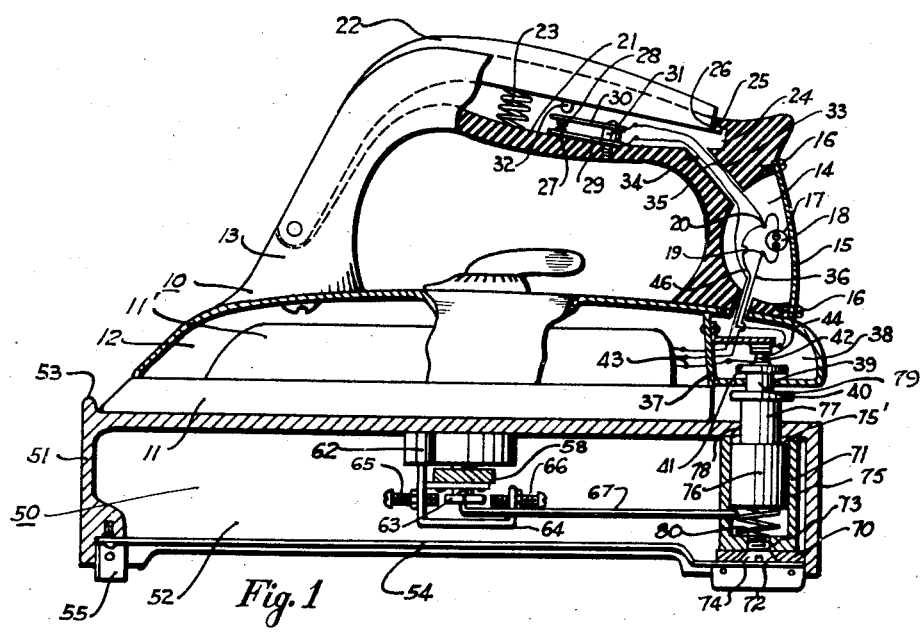
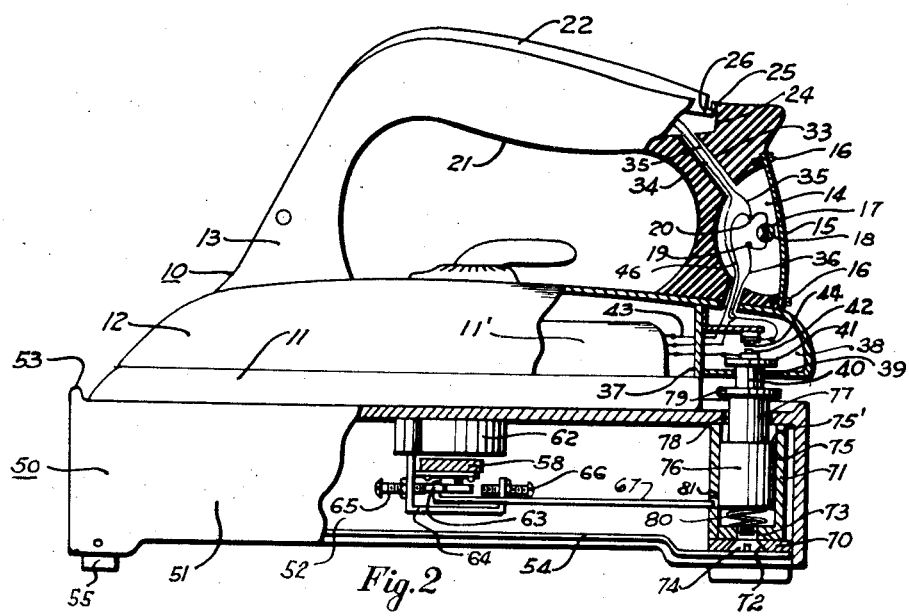

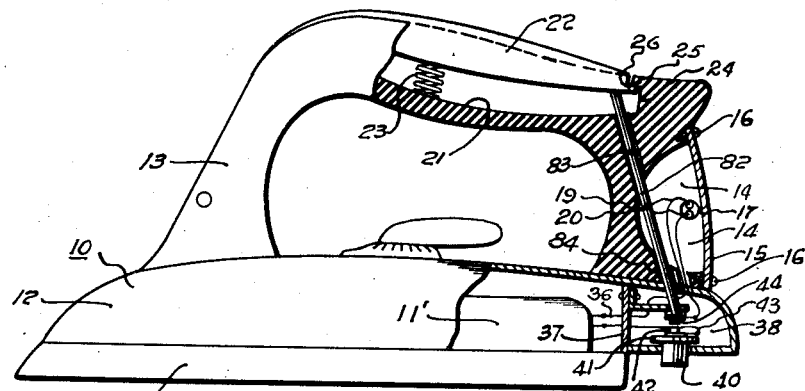
Fig. 7
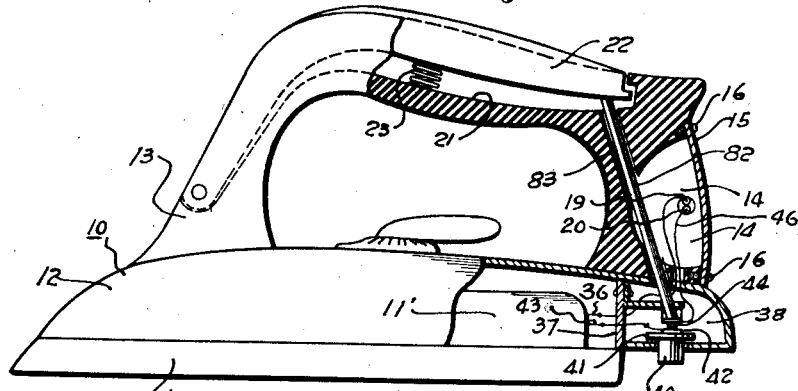
Fig. 8
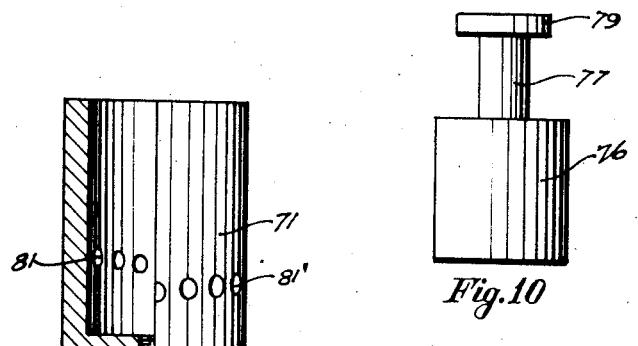
Fig. 9
Fig. 10
Inventor
Arthur G. Shearer Patented Dec. 10, 1940

2,224,198

UNITED STATES PATENT OFFICE 2,224,198

ELECTRIC IRON AND SUPPORT FOR SAID IRON

Arthur G. Shearer, Houston, Tex.

Application August 4, 1939, Serial No. 288,270

5 Claims. (Cl. 219—25)

This invention relates to new and useful improvements in electric irons and supports for said irons.

One object of the invention is to provide an improved iron and a support therefor having means for controlling the electrical current flowing to the iron, whereby proper heating to maintain the desired working temperature is assured without danger of overheating.

An important object of the invention is to provide a thermostatic control in support which control co-acts with depressible means arranged to be engaged by iron, whereby when iron is resting on said support, the thermostat is the sole controlling element.

A further object of the invention is to provide an improved iron and a support therefor, said iron having a manual switch on its handle and a second switch also carried by said iron with the latter switch arranged to co-act with thermostatically controlled means on rest or support to complete an electrical circuit and heat the iron.

Another object of the invention is to provide an improved electric iron and a support for said iron, which support co-acts with the iron to cause an electrical contact to be made to permit heating of the iron, such contact being automatically broken to open the electrical circuit when the iron reaches a predetermined degree of heat, whereby overheating of the iron is prevented.

A further object of the invention is to provide an improved electric iron having means associated with its handle, whereby the pressure of the operator's hand, holding the iron while performing the ironing operation, will actuate said means to close an electrical circuit and thereby maintain said iron at an ironing temperature, said means automatically releasing and breaking the electrical circuit when the hand of the operator is removed from the handle of the iron.

A still further object of the invention is to provide an improved electric iron and a support for said iron which will act together to maintain the iron at a proper and safe working temperature.

A construction designed to carry out the invention will be hereinafter described, together with other features of the invention.

The invention will be more readily understood from a reading of the following specification and by reference to the accompanying drawings in which an example of the invention is shown, and wherein:

Figure 1 is a side view of the invention showing the iron and its support partly in elevation and partly in section with the thermostat control in a circuit closing position as to cause the iron to heat, Figure 2 is a similar view with the thermostat control in a position holding the electrical circuit open to allow the iron to cool, Figure 3 is a view similar to Figure 1 with the support omitted and the handle control depressed so as to cause the iron to heat, Figure 4 is a bottom view of the support with its bottom cover plate removed, thus showing the thermostat control mechanism, Figure 5 is a transverse, sectional view taken on the line 5—5 of Figure 4, Figure 6 is an end view of the iron with sections cut away to show the wiring arrangement of the iron, Figure 7 is a side view of a modified form of the invention, partly in section and partly in elevation, showing a different method of constructing the handle control mechanism, Figure 8 is a view similar to Figure 7 with the handle control mechanism depressed to complete the electrical circuit and heat the iron, Figure 9 is a side view, partly in elevation and partly in section, of a portion of the thermostat control, and Figure 10 is a side elevation of another part of the thermostat control.

In the drawings the numeral 10 designates an iron having the usual bottom ironing surface 11 designed to be heated by an electrical heating element 11 carried in a housing 12, which fits snugly over the upper portion of the surface 11. The customary handle 13 is suitably mounted on the upper portion of the housing 12 and is so formed as to allow the convenient use of the iron. The rear portion of the handle 13 is enlarged, as shown in Figures 1 and 6, and has a recess or pocket 14 formed therein, said recess being closed by a cover plate 15 fastened thereon by screws 16, or other suitable means. An opening 17 is provided in one side wall of the recess 14 to allow an electric cord 18 to enter the recess. The electric cord carries two wires, as in the usual household appliances, said wires being connected to a pair of terminals 19 and 20 mounted within the recess 14.

The handle 13 is formed with a longitudinally disposed groove 21 in its upper surface, as shown in Figures 1 and 6. The groove 21 extends to the forward part of the handle and has a lever 22 pivotally mounted in its forward end, said lever conforming to the shape of the groove and extending to the rear portion thereof. A coil spring 23 is suitably located in a substantially vertical position within the groove 21 and beneath the lever 22, thus tending to continually urge the lever upwardly. The rear portion of the groove 22 terminates in a recess 24, thus forming a short overhanging lip 25 which extends laterally across and above said rear portion. The rear extremity of the lever 22 is provided with an axially extending flange 26 which projects beneath the lip 25 and is retained thereby. Thus the action of the spring 23 in urging the lever upwardly is limited by the flange 26 as it engages beneath the lip 25. Obviously, as the hand of the operator is placed on the handle of the iron for the purpose of using the same, the pressure of the hand will force the lever 22 downwardly against the compressive force of the spring 23.

A pair of electrical contacts 27 and 28 are carried on spring members 29 and 30 which are suitably mounted in the bottom portion of the groove 21, and insulated, one from another, by an insulating washer 31. The contacts 27 and 28 are in vertical alinement and in their normal, undistorted position are held apart by the spring action of the members 29 and 30. Pressure on the lever 22 will force the same downwardly, as hereinbefore pointed out, and allow a downwardly extending button 32, carried on the lower side of the lever, to engage the upper contact 28 and force it into engagement with the lower contact 27. In this manner an electrical circuit is made or broken by the action of the lever 22.

The handle 13 is provided with an opening 33 which extends from the rear portion of the groove 21 to the recess 14, and serves to convey lead wires 34 and 35 from the contact members of the contacts 27 and 28, respectively, into said recess. The wire 34 leads from the contact point 27 through the opening 33, recess 14 and down through the bottom of the recess to connect to the heating element 11 of the iron. The wire 35 leads from the contact point 28 to the terminal 20 of the lead in wire, as shown in Figure 1. A third wire 36 leads from the terminal 19 down to heating element and thus, when the lever 22 is depressed, serves to complete a circuit through the heating element, wire 34, contact points 27 and 28, and wire 35, back to terminal 20 as shown in Figure 3. Since the source of electrical power is connected to terminals 19 and 20, the completion of this circuit will cause an electric current to flow through the circuit and the heating element and thereby heat the iron to a working temperature. When the iron is set down and the hand of the operator no longer exerts pressure on the lever 22, the circuit will be broken and the danger of the iron's overheating eliminated.

The housing 12 of the iron extends rearwardly of the ironing surface 11 and projects beneath the rear portion of the handle 13. A vertical partition 37 extends transversely of said housing at a point substantially directly above the rear end of the ironing surface 11 and forms a small compartment 38 in the rear portion of the housing. The lower portion of the compartment 38 is disposed in a horizontal plane above the ironing surface, thus providing a space below said compartment as shown in Figure 1. A vertical opening 39 is formed in said lower portion and has a cylindrical button 40 slidably disposed therein, and projecting downwardly therethrough. The button 40 carries an annular flange 41 about its upper edge and an electrical contact point 42 on its upper extremity. The flange 41 is of substantially larger diameter than the opening 39 and prevents the button 40 from falling therethrough. The contact point 42 is connected to the heating element by a wire 43 which passes through the partition 37 and establishes electrical contact between said contact point and said heating element. Another electrical contact point 44 is suitably mounted above the contact point 42 and in vertical alinement therewith, whereby upward motion of the button 40 will establish contact between the points 42 and 44. A spring 45 is suitably mounted within the compartment 38 so as to constantly urge the button 40 downwardly and thus break the contact between points 42 and 44, the purpose of which action will be described hereinafter.

The contact point 44 is connected to the terminal 20 by means of a wire 46, and completes an electrical circuit through the terminal 20, wire 46, contact point 44, contact point 42, wire 43, to the heating element, and back to terminal 19 by wire 36. Thus, when the button 40 is forced upwardly against the spring 45, an electrical circuit is made through the contact points 42 and 44, and the iron is heated. It is pointed out that this circuit operates separately from the circuit operated by the handle 13 and lever 22, and that either or both circuits may be in operation at once, although both circuits accomplish the same result.

The support 50 is preferably cast from aluminum, but the invention is not limited to this manner of construction as any suitable material may be used. Aluminum is mentioned because of its uniform heat distributing characteristics. The support is formed substantially in the shape of the ironing surface of the iron, as shown in Figure 4, and has depending sides 51 forming a space 52 within said support. The upper surface of the support is smooth and has raised edges 53 about its periphery, whereby the iron is prevented from sliding therefrom. The open lower portion of the support 50 is closed by a suitable plate 54 and heat-resisting legs 55 may be provided at the corners of the support.

Shoulders or bosses are formed adjacent the sides 51, and in the mid-portion thereof, as shown in Figure 4. Vertical screw-holes (not shown) are provided in said shoulders and receive screws 57 which fasten an elongate cross-member 58 rigidly to said shoulders, whereby said cross-member extends transversely of the support and spaced a distance from the upper surface thereof. A shaft 59 is journaled in the middle of the cross-member 58 and extends upwardly therefrom to the upper surface of the support 50, said shaft being retained on the cross-member by means of retaining nuts 60 and 61 mounted on the shaft on either side of the cross-member. Thus the shaft is free to rotate within the member 58 but is held in vertical alinement thereby. A flat spring 62 encompasses that portion of the shaft 59 between the member 58 and the upper surface of the support; and has its inner end rigidly fastened to said shaft, while its outer end is rigidly attached to the support 50. The spring 62 is made of bi-metal, the purpose of which will be described hereinafter, and tends to urge the shaft 59 to rotate in a counter-clockwise direction, as viewed in Figure 4.

The lower end of the shaft 59 extends through the member 58, and has an arm 63 rigidly secured thereupon, whereby rotation of the shaft 59 will cause the arm 63 to travel in an arc about the center of said shaft. The outer end of said arm is confined between the vertical portions of an elongate guide member or bracket 64, and set screws 65 and 66 are mounted axially in either end of said guide member whereby the movement of arm 63 may be varied and set for various and specific conditions.

As stated hereinbefore, the spiral spring 62 is constructed of bi-metal. Thus the tension said spring exerts and the direction in which said tension is exerted depends upon the temperature of the spring. When the spring is cold it tends to rotate the shaft 59 and the arm 63 in a counter-clockwise direction to the position shown in solid lines in Figure 4. When the spring becomes heated to a certain point the effect of the bi-metal will become greater than the effect of the spring and said spring will tend to rotate the shaft and arm in a clockwise direction, as shown in dotted lines in Figure 4. Obviously, the rotation of the shaft and the arm is limited, in either direction, by the set screws 65 and 66.

The arm 63 is pivotally connected by any suitable means with an elongate rod 67 which extends to the rear portion of the support 50. It will readily be seen in Figure 4, that movement of the arm by rotation of the shaft 59 will impart a reciprocating motion to the rod 67 along the axis of said rod.

Shoulders 68 are formed in the support 50 at the rear portion and on either side thereof. Screw-threaded openings (not shown) are formed in the lower faces of said shoulders and receive screws 69 which rigidly secure an elongate cross-member 70 to said shoulders. The cross-member 70 extends transversely of the support 50 and is spaced slightly above the lower surface thereof so as to allow the cover plate 54 to fit snugly over said bottom portion. A cylinder or sleeve member 71 is mounted vertically between cross-member 70 and the upper surface of the support, and rests on the central portion of said cross-member. A vertical opening 72 is provided in the center of the cross-member and lies directly beneath a screw-threaded opening 73 in the bottom surface of cylinder 71. A screw 74 passes through the opening 72 and engages the opening 73 to secure the cylinder 71 rigidly to the cross-member 70.

As is clearly shown in Figure 1, the cylinder extends to the lower surface of the upper portion of the support 50, and is formed with an axial bore 75. A piston 76 is slidably mounted with the cylinder and has its upper portion 77 reduced in diameter, forming an annular shoulder 75', as shown in Figure 10. An opening 78 is located in the upper surface of the support 50 directly above the bore 75 and is of such diameter as to receive the reduced portion 77 of the piston 76, but of smaller diameter than the piston itself. The reduced portion 77 projects through the opening 78 and carries an annular flange 79 about its upper surface forming a button 79'. The flange 79 is of larger diameter than the opening 78 and cannot pass therethrough. Thus the piston is limited in its upward and downward movement by the flange 79 and the shoulder 75' engaging the upper surface of the support 50, the flange and shoulder being incapable of passing through the opening 78.

A coil spring 80 is contained in a vertical position within the bore 75, and the piston 76 rides thereon, whereby the spring tends to constantly urge the piston upwardly, its upward motion being limited by the shoulder 75'. The cylinder 71 is provided with a series of annular openings 81 which lie in a helix 81' about the periphery of said cylinder. The rod 67 passes through one of these openings and when the arm 63 is in its rearward position, as shown in solid lines in Figure 4, engages beneath the lower edge of the piston 76. Thus, the piston and the button 79' are held in an upwardly extended position by the rod 67. When the arm 63 is in its forward position, as shown in dotted lines in Figure 4, the rod is withdrawn until its rear end no longer engages beneath the piston 76, thus, allowing said piston to drop if a downward force is applied thereto. The helix 81' of openings 81, being at different heights in the side wall of the cylinder 71, allows the device to be adjusted for different conditions. Thus, the screw 74 may be withdrawn and the cylinder 71 rotated about its axis to bring another opening 81 into position to receive the rod 67. The different heights of the openings allow the piston 76 to be forced downwardly to different positions within the cylinder 71, as will be explained hereinafter.

In the operation of the device, the iron is placed on the support 50. At this time the support and the thermostat spring 62 are relatively cool and said spring is urging shaft 59 and arm 63 in a counter-clockwise direction, as seen in Figure 4, thus forcing the rod 67 through the opening 71 and beneath piston 76, holding said piston in an upwardly extended position. As the iron is placed on the support, button 79, engages button 40 on the lower surface of compartment 38 and forces button 40 upwardly against spring 45, thus completing the electrical circuit described hereinbefore, and heating the iron as shown in Figure 1. As the temperature of the iron increases, it radiates heat to the support 50 and all of the mechanism contained therein. The bi-metallic spring 62 absorbs this heat and commences to rotate the shaft 59 and the arm 63 in a clock-wise direction, as shown in Figure 4. When the iron reaches a predetermined temperature, chosen as a limiting temperature to which the iron may safely heat, the spring 62 has rotated the arm 63 to such a point that the rod 67 is withdrawn from contact with the lower edge of piston 76. Spring 45, being stiffer and stronger than spring 80, is then free to force button 40 and button 79' down against the pressure of spring 80, and thus break the electrical circuit, as shown in Figure 2, and prevent the iron from overheating.

As the iron cools, the flat spring 62 cools and rotates the arm 63 in a counter-clockwise direction, urging rod 67 through the opening 81. The end of the rod strikes the side of the piston 76 and is held from further motion thereby. Merely raising the rear of the iron will remove the pressure of the spring 45 and button 40 from the button 79', and allow spring 80 to force piston 76 upwardly and the spring 62 to force rod 67 beneath piston 76. Rod 67 is now again engaged beneath piston 76 and prevents its downward motion. Lowering the iron to its original position on the support 50, the button 79' again forces the button 40 upwardly and completes the electrical circuit to heat the iron again. In this manner, merely the occasional raising of the iron from the support by the operator, and the lowering again thereto, will maintain the iron at its proper ironing temperature and eliminate the danger of overheating the iron to an unsafe temperature.

When at any time during the procedure, the iron is picked up to be used, the pressure of the operator's hand will complete the circuit through the handle switch and heat the iron, thus preventing the iron from becoming too cold to operate properly. As the iron is replaced on the support after use, the thermostat control within the support will function to prevent the iron from overheating. Thus the two circuits, described hereinbefore, coact to maintain the iron at the proper temperature, yet protect it from the injurious effects of excessive heating.

A modified form of the invention is shown in Figures 7 and 8. In this form, the contact points 27 and 28, and other switch mechanism in the handle 13, are replaced by an elongate rod 82 which extends from the rear portion of the lever 22 down through an opening 83 in the rear portion of the handle 13, into recess 14, through an opening 84 into the compartment 38, and engages the upper contact point 44 mounted in said compartment. In this form the wires 34 and 35 are eliminated and wires 36, 43 and 46 retained. When the lever 22 is forced downwardly by the pressure of the operator's hand, the rod 82 is pressed downwardly along its axis by said lever. This action causes the lower end of rod 82 to engage the upper surface of contact point 44, and force said point into engagement with contact point 42, thereby completing an electrical circuit through wire 46, contact point 44, contact point 42, wire 43, the heating element (not shown), and back along wire 36 to the electric cord where it enters the handle of the iron.

The completion of this circuit will cause the iron to heat just as in the first form of the invention described hereinbefore. Removal of the operator's hand will allow the lever 22 to be urged upwardly by spring 23 and thus break the circuit. The resiliency of the contact point 44 will allow it to move upwardly, forcing the rod 82 upwardly and breaking the circuit between itself and contact point 42. In this form of the invention, the support is identical with the support 50, described in the first form, and functions in an identical manner. The only difference between the two forms lies in the mechanism by which pressure on the lever 22 completes an electrical circuit to heat the iron.

The iron hereinbefore described and its support act together as a unit to maintain the iron at a proper working temperature and at the same time prevent said iron from overheating and being damaged thereby and causing a fire-hazard to exist.

Various changes, alterations and modifications may be made in the size, shape and arrangement of the herein described elements, within the scope of the appended claims.

What I claim and desire to secure by Letters Patent is:

1. In combination, an electric iron and a support for said iron including, a body portion having an ironing surface, a heating element within said body portion for heating said surface, a handle, an electrical circuit leading to said heating element, means within said circuit actuated by the pressure of the hand of the operator on the handle of said iron in the course of normal ironing operations, said means completing the electrical circuit and allowing the iron to heat when pressure is applied to said handle, and breaking said electrical circuit when pressure is removed therefrom, contact means within the base of said iron, and temperature-controlled means in said support for engaging said contact means and causing the same to complete said electrical circuit and heat the iron whereby said electrical circuit may be broken and the current shut off until such time that the means within the support has been reset.

2. In combination, an electric iron and a support for said iron including, a body portion having an ironing surface, a heating element within said body portion for heating said surface, a handle, an electrical circuit in which said heating element is connected, means within said circuit actuated by the pressure of the hand of the operator on the handle of said iron in the course of normal ironing operations, for completing the electrical circuit and allowing the iron to heat when pressure is applied to said handle and for breaking said electrical circuit when pressure is removed therefrom, contact means within the base of said iron and connected in the electrical circuit of the heating element and temperature controlled means in said support for controlling said contact means and co-acting therewith to complete said electrical circuit and heat said iron, said contact means and said temperature-controlled means being so arranged as to break said electrical circuit in the event that said iron becomes excessively heated whereby said iron cannot be reheated until said iron is raised in order that said means may be reset.

3. As a combination an electric iron and a support for said iron including, a body portion having an ironing surface, a heating element within said body portion, an electrical circuit leading to said heating element, contact means within the base of said iron and connected in the electrical circuit of the heating element and temperature-controlled means in said support for controlling said contact means and co-acting therewith to break said electrical circuit in the event that said iron becomes excessively heated whereby said electrical circuit is broken until said iron is lifted from the support so as to allow said means to reset and thereby reestablish said circuit.

4. In combination, an electric iron having a pressure-operated switch in its handle and a spring actuated switch in its base, said switches being electrically connected, an operating member carried by the iron having a portion for engaging and closing the spring switch, and a stand for said iron free from electrical circuits and connections and having a heat-responsive element, means on the stand engaged by the operating member of the iron for closing the spring switch when the iron is placed upon said stand, and a latch carried by the stand and connected with said means for maintaining said means in engagement with said operating member to close the spring switch, the heat-responsive element being set to withdraw said latch and release said means to permit said spring switch to open when the iron reaches a predetermined degree of heat.

5. In combination, an electric iron having an electric circuit including a heating element, switch means, and a switch-operating member, and a stand receiving said iron including a switch-operating element engaged by the switch-operating member when the iron is placed on the stand to close the heating circuit, a heat-responsive device carried by the stand, and a latch operated by said heat-responsive device movable on the stand and normally holding the operating element in switch-operating position, said heat-responsive device being set to withdraw said latch and free the said operating element to release the switch-operating means in said iron whereby the heating circuit is broken, said heat-responsive device including means to move the latch into position to latch the switch-operating element when the iron is lifted from the stand.

ARTHUR G. SHEARER.